Dec. 21, 1965  G. E. ENGDAHL  3,224,212
PROCESS AND APPARATUS FOR CONTINUOUSLY DEHYDRATING GAS
Filed Jan. 8, 1964
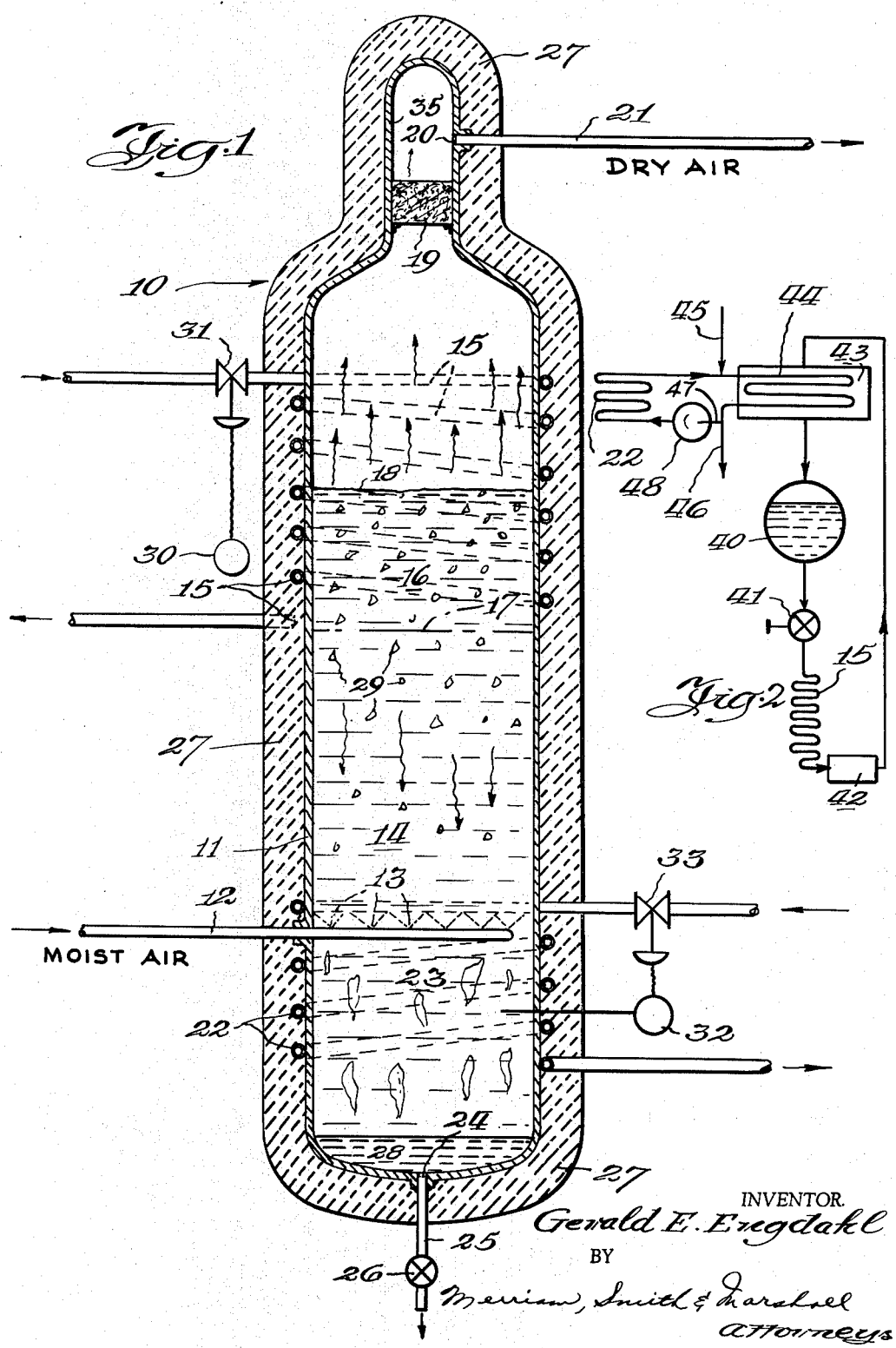

United States Patent Office 3,224,212
Patented Dec. 21, 1965

3,224,212
PROCESS AND APPARATUS FOR CONTINUOUSLY
DEHYDRATING GAS
Gerald E. Engdahl, Lombard, Ill., assignor to Chicago
Bridge & Iron Company, Hinsdale, Ill., a corporation
of Illinois
Filed Jan. 8, 1964, Ser. No. 336,407
2 Claims. (Cl. 62—40)

The present invention relates generally to a process and apparatus for removing moisture from gas, and more particularly to a process and apparatus for continuously dehydrating air for use in operating pneumatic devices.

It is important that air used for operating pneumatic devices such as control instruments, pneumatic valves, and the like, be free of moisture, to prevent condensation and freezing thereof in the devices during operation. Condensation can cause corrosion, or other undesirable side effects.

Using a conventional air-dehydrating process in which the air is circulated about or through cooling coils has a number of drawbacks. For example, if the cooling coils are operating at a temperature above the temperature of the pneumatic device, there is a likelihood of subsequent condensation on the cooler pneumatic device of moisture retained in the air which had previously been circulated about the warmer cooling coils.

On the other hand, if the coils are maintained at a temperature sufficiently low to prevent subsequent condensation of water vapor on the pneumatic device, it would be necessary to operate the coils at temperatures which will cause freezing of the moisture that condenses thereupon. When this occurs, it becomes necessary to periodically interrupt the dehydrating operation for removal of ice accumulated upon or in the coils. This interruption will necessitate provision of an alternate cooling coil, or will necessitate interruption of the dehydrating operation for a period of time sufficient to enable removal of the ice.

All of these drawbacks are eliminated by apparatus and methods in accordaance with the present invention. Essentially, the apparatus includes a vertically disposed vessel partially filled with a vertical column of relatively viscous liquid having a specific gravity less than water and less than ice. The air to be dehydrated is introduced continuously into the vessel, below the surface of the viscous liquid, in the form of divided streams of bubbles.

The air bubbles rise through the viscous liquid and pass thruogh a freezing zone or ice crystal-forming zone having a lower limit located above the air-introducting means. The temperature of the freezing zone is regulated by conventional cooling means such as a refrigeration coil. Moisture in the air bubbles is frozen as the air bubbles move upwardly through the freezing zone, and the ice crystals thus formed drop downwardly through the less dense viscous liquid. The air from which moisture has been removed continues to rise upwardly through the viscous liquid and is removed through an air outlet at the top of the vessel.

The viscous liquid has a low vapor pressure, below the pressure conditions prevalent inside the apparatus, so that entrainment of viscous liquid vapor in the air is not a significant problem.

Also located in the vessel, below the freezing zone, is a melting zone for melting the descending ice crystals. The melted ice crystals, in the form of liquid water, accumulate at the bottom of the vertically disposed vessel; and the water is drawn off through an outlet. The heating medium for the melting zone is conventional and may be in the form of a coil for circulating a warm fluid around the vessel, or may be in the form of electrical heating elements.

The entire vessel, including the freezing and heating elements, is enclosed within insulation. This, together with the viscous nature of the vertical column of liquid within the vessel, retards transfer of heat between and in the melting zone and the freezing zone. Furthermore, because the freezing zone terminates at a lower limit above the air-introducing means, there is no likelihood of freezing at the location where the air is introduced, and accordingly, no likelihood of interference with the entry of air by accumulations of ice around the entry.

The apparatus and methods described above enable a continhous uninterrupted operation for dehydrating air to the extent of completeness desired.

Other features and advantages are inherent in the structure and methods claimed and disclosed or will become apparent to those skilled in the art from the following detailed description in conjunction with the accompanying diagrammatic drawing wherein:

FIGURE 1 is a vertical sectional view of apparatus constructed in accordance with the present invention; and FIGURE 2 is a schematic diagram of a refrigeration system for use in conjunction with the apparatus of FIGURE 1.

Referring initially to FIGURE 1, there is indicated generally, at 10, an embodiment of apparatus, constructed in accordance with the present invention, for continuously dehydrating air for use in pneumatic devices. Apparatus 10 includes a vertically disposed vessel 11 containing a vertical column of relatively viscous liquid 14 held within a container portion of the vessel. Vessel 11 may be constructed from metal such as steel, stainless steel or other iron base nickel alloy, or from aluminum or copper.

Vessel 11 may also be constructed from plastics, glass or a combination of these materials, all of which have low thermal conductivity; and heat transfer through the walls extending parallel to the long or vertical axis of vessel 11 will be less than if vessel 11 is constructed of steel or copper.

Liquid 14 has a viscosity between 40 and 5,000 Saybolt Universal Seconds at temperatures between —100° F. and 40° F., the operating temperature range for which apparatus 10 is intended; the viscous liquid has a specific gravity less than that of water and of ice; and it has a vapor pressure less than atmospheric at the operating temperatures of —100° F. to 40° F.

Typical embodiments of viscous liquid 14 include kerosene, fuel oil, conventional light oils, or any other hydrocarbons or combinations of these hydrocarbons with other hydrocarbons so long as the liquid has a specific gravity less than water or ice, and has a viscosity and vapor pressure within the ranges set forth above.

Air containing moisture therein is introduced into vessel 11, below the top surface 18 of liquid 14, by means of a sparge pipe 12 containing a plurality of small openings 13 for distributing the air as divided streams of bubbles. Moisture is in the bubbles of air which ascend upwardly through viscous liquid 14.

Located above air-introducing means 12 is means for removing sufficient heat to effect a freezing of the moisture in the air bubbles, said heat-removing means being, in this embodiment, a refrigeration coil 15. Coil 15 provides a freezing zone 16 having a lower limit (dash-dot line 17) located below viscous liquid surface 18 and above air-introducing means 12. By virtue of this relative disposition of freezing zone 16 and air-introducing means 12, and because the entire apparatus is insulated, heat loss at introducing means 12 is minimized so that there is no freezing at openings 13 of sparge pipe 12. This eliminates clogging of openings 13 by ice, and provides air bubbles of desirable diameter and surface area.

Moisture in the air bubbles is frozen at freezing zone 16 and forms ice crystals 29 which, because they have a specific gravity greater than that of viscous liquid 14, descend through liquid 14 toward the bottom of vessel 11. Air from which moisture has been removed rises above the top surface 18 of viscous liquid 14 toward an air outlet 20 in a vessel neck portion 35. Connected to outlet 20 is a conduit 21 for conducting the dehydrated air to the pneumatic device which the air is intended to operate.

Because the viscous liquid 14 has a relatively low vapor pressure, there is no significant amount of viscous liquid mist entrained in the dehydrated air. However, to remove such insignificant amounts of viscous liquid mist as may be entrained in the air, a conventional mist collector 19 is provided in neck 35 of vessel 11, above liquid surface 18 and before air outlet 20.

Located below freezing zone 16 and extending below air-introducing means 12, is a zone 23 for melting the descending ice crystals. The heat for melting the ice crystals is provided by a heating coil 22, which, in the illustrated embodiment, circulates a heating fluid around the exterior of vessel 11, but which may also be in the form of electrical heating elements, or the like. Ice crystals 29 are melted as they descend through melting zone 23, and the resulting liquid water accumulates at 28 at the bottom of vessel 11. Water 28 is drawn off through a water outlet 24 by opening a valve 26 on a draw-off conduit 25 connected to water outlet 24.

The entirety of vessel 11, freezing means 15 and melting means 22 is enclosed within conventional insulating material 27.

The melting capabilities of heating coil 22 are controlled by a valve 33 in turn controlled by a conventional temperature-sensing device 32 which senses the temperature in melting zone 23.

Similarly, the freezing capability of refrigeration coil 15 is controlled by a valve 31 in turn controlled by a conventional temperature-sensing device 30 which senses the temperature in freezing zone 16.

The operation of apparatus 10 is a continuous, uninterrupted one in which air enters vessel 11 through openings 13, rises upwardly through viscous liquid 14, has water removed therefrom at freezing zone 16, passes upwardly above top surface 18 of fluid 14, passes through mist collector 19 and then out through air outlet 20. Ice crystals forming in zone 16 descend downwardly until they reach melting zone 23 where the ice crystals change phase and become liquid water which accumulates at the bottom of the vessel to be drawn off through outlet 24.

No interruptions are necessary for removal of ice from within the vessel. No interruptions are necessary for replenishment of liquid 14 because of the low vapor pressure thereof and because of mist collector 19 which minimizes viscous liquid carried out as mist through opening 20 with the air.

Referring now to FIGURE 2, there is illustrated a refrigeration system which may be used in conjunction with the apparatus 10 of FIGURE 1. The system includes a conventional receiver 40 containing relatively warm refrigeration fluid in liquefied form. Refrigeration fluid from receiver 40 is expanded through conventional expansion valve 41 to a relatively low pressure and temperature. The resulting cold liquid and vapor pass through coil 15 in which the cold liquid is vaporized as coil 15 removes heat from freezing zone 16. From coil 15, the vapor is withdrawn to a conventional compressor 42 and compressed to a pressure at which it may be condensed by water or other cooling medium in a condenser 43 from which the condensed fluid passes to receiver 40.

Condenser 43 includes a cooling coil 44, and cooling fluid circulated through condenser coil 44 may be in the form of conventional cooling water entering coil 44 through an inlet 45 and exiting from coil 44 through an outlet 46. Also connected to coil 44 is a bypass 47 including a pump 48 and connecting coil 44 to heating coil 22 which extends around vessel 11. Utilizing a connection of this type, heated fluid exciting from condenser coil 44 is circulated through heating coil 22 to perform the function of melting the ice crystals in melting zone 23 of apparatus 11. The cooled fluid exciting from coil 22 may be returned to coil 44 in condenser 43.

The cooling medium circulated through coil means 15 may be a hydrocarbon, anhydrous ammonia, nitrogen or other refrigerant of the type readily available in a refrigerated storage facility such as in the case of large volume storage of liquid nitrogen, ammonia, propane, ethylene, butane and liquid natural gas at temperatures ranging from $+40°$ F. to $-320°$ F.

The foregoing detailed description has been given for clearness of understanding only, and no unnecessary limitations should be understood therefrom, as modifications will be obvious to those skilled in the art. For example, the above-described process and apparatus may be used to remove water vapor from gases other than air (e.g., nitrogen) so long as these other gases liquefy at a temperature substantially below the freezing temperature of water so that they don't undergo substantial liquefication in the freezing zone under conditions which freeze the water vapor.

What is claimed is:

1. Apparatus for removing water vapor from another gas having a liquefaction temperature below the freezing temperature of water, said apparatus comprising:

a vertically disposed vessel having a lower container portion and an upper neck portion of reduced cross-sectional area relative to said container portion;

said container portion holding a relatively viscous liquid having an upper surface located below said neck portion;

said viscous liquid having a specific gravity less than water and less than ice, and having a viscosity between 40 and 5,000 Saybolt Universal Seconds at temperatures between $-100°$ F. and $40°$ F., and having a vapor pressure less than atmospheric at temperatures between $-100°$ F. and $40°$ F.;

means for introducing said gas, containing said water vapor, into said container portion below the surface of said viscous liquid;

said introducing means including means for distributing said gas as divided streams of bubbles;

gas outlet means extending from said neck portion;

a refrigeration circuit comprising an evaporator coil and a condenser coil;

said evaporator coil encircling an exterior upper section of said container portion to provide a freezing zone in the container portion above said gas introducing means;

another coil connected to said condenser coil for circulation of fluid from the condenser coil to said other coil;

said other coil encircling an exterior lower section of the container portion to provide a heating zone below said freezing zone;

a pair of temperature control means each for controlling the temperature in a respective one of said zones;

means, at the bottom of said container portion, for receiving and withdrawing water in its liquid phase;

mist collector means in said neck portion, between said gas outlet means and said upper surface of the viscous fluid, for removing viscous fluid mist from said gas; and insulating means enclosing the entirety of said vessel and enclosing said evaporator coil and said other coil.

2. Apparatus as recited in claim 1 wherein:
said evaporator coil encircles an exterior section of the container portion which extends below the upper surface of the viscous fluid;
and said other coil encircles an exterior section of the container portion which extends below said gas introducing means.

References Cited by the Examiner

UNITED STATES PATENTS

| | | | |
|---|---|---|---|
| 850,680 | 4/1907 | Smith | 55—30 |
| 1,945,592 | 2/1934 | Bueckert | 62—24 |
| 2,507,632 | 5/1950 | Hickman. | |
| 2,516,717 | 7/1950 | Ogorzaly | 62—13 |
| 2,613,513 | 10/1952 | Shields | 62—58 XR |
| 2,758,665 | 8/1956 | Francis | 62—20 XR |
| 3,071,520 | 1/1963 | Smalling | 202—160 |

NORMAN YUDKOFF, *Primary Examiner*.